(12) United States Patent
Szostek et al.

(10) Patent No.: US 9,337,679 B2
(45) Date of Patent: May 10, 2016

(54) ELECTRIC VEHICLE CHARGING SYSTEM AND METHOD

(71) Applicant: NXP B.V., Eindhoven (NL)

(72) Inventors: Lukasz Szostek, Olsztyn (PL); Jan Rene Brands, Nijmegen (NL)

(73) Assignee: NXP B.V., Eindhoven (NL)

( * ) Notice: Subject to any disclaimer, the term of this patent is extended or adjusted under 35 U.S.C. 154(b) by 339 days.

(21) Appl. No.: 13/707,467

(22) Filed: Dec. 6, 2012

(65) Prior Publication Data

US 2013/0154562 A1 Jun. 20, 2013

(30) Foreign Application Priority Data

Dec. 14, 2011 (EP) ..................................... 11193435

(51) Int. Cl.
*H02J 7/00* (2006.01)
*B60L 11/18* (2006.01)
(52) U.S. Cl.
CPC .............. *H02J 7/007* (2013.01); *B60L 11/1838* (2013.01); *B60L 11/1848* (2013.01); *B60L 2270/36* (2013.01); *Y02T 10/7005* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)
(58) Field of Classification Search
CPC ....................................................... Y02T 90/14
USPC ......................................................... 320/109
See application file for complete search history.

(56) References Cited

U.S. PATENT DOCUMENTS

| 5,548,200 | A | * | 8/1996 | Nor et al. | 320/109 |
| 5,563,491 | A | * | 10/1996 | Tseng | 320/109 |
| 5,742,229 | A | | 4/1998 | Smith | |
| 2002/0158749 | A1 | | 10/2002 | Ikeda et al. | |
| 2010/0188042 | A1 | * | 7/2010 | Yeh | 320/109 |
| 2010/0274697 | A1 | * | 10/2010 | Zyren | 705/34 |
| 2011/0213983 | A1 | | 9/2011 | Staugaitis et al. | |

FOREIGN PATENT DOCUMENTS

| CN | 201804374 U | 4/2011 |
| EP | 2 199 143 A1 | 6/2010 |
| WO | 2011/067655 A2 | 6/2011 |

OTHER PUBLICATIONS

Extended European Search Report for Patent Appln. No. 11193435.2 (Jun. 6, 2012).
Office Action from counterpart application CN101210530838.2 (Jun. 16, 2014).
Communication pursuant to Article 94(3) EPC for application EP 11 193 435.2 (Mar. 20, 2014).

* cited by examiner

*Primary Examiner* — Yalkew Fantu

(57) ABSTRACT

The invention provides an electric vehicle charging system in which the charging station and the vehicle each have a power transfer measurement unit, and a communication system for communicating data at least from the vehicle to the station. The power delivery is controlled based on a comparison of power transfer measurements made by the charging station and by the electric vehicle control system.

8 Claims, 2 Drawing Sheets

ELECTRIC VEHICLE CHARGING SYSTEM AND METHOD

CROSS-REFERENCE TO RELATED APPLICATIONS

This application claims the priority under 35 U.S.C. §119 of European patent application no. 11193435.2, filed on Dec. 14, 2011, the contents of which are incorporated by reference herein.

This invention relates to system and method for charging electric vehicles at pay stations.

The use of electric cars is expected to become widespread as the technology advances and the cost of fossil fuels rises. Although the charging of an electric car can take place at the home, electric charging stations will also be developed to allow car charging en-route. By using three-phase power supplies, more rapid charging is possible than in the home, making en-route recharging feasible.

In currently proposed charging systems, the user will pay an amount in advance at the charging station. The charging station can be coin-operated thus not requiring a back-end, or it can be credit-card based or require subscription to a charging service. These solutions of course do require a connection to a back-end system.

A problem with electric car charging is that the purchase is less tangible than petrol or diesel, in that the customer cannot easily determine that they have received the amount of energy they have paid for. In the case of diesel or petrol, the user knows the size of the tank, and knows the cost of the petrol or diesel per unit, and can easily make a rough assessment that the correct amount has been paid for. In the case of an electric car, there is a greater possibility of a customer not realising that it has not received the power transfer it has paid for.

There is a need for a payment system which implements trust automatically between the customer and the service station.

According to the invention, there is provided an electric vehicle charging system, and a method as defined in the claims.

The electric vehicle charging system can comprise:
a charging station which comprises:
a power delivery system;
a power transfer measurement unit; and
a communication system for communicating with an electric vehicle; and
a charging monitor mounted in an electric vehicle which comprises:
a power transfer measurement unit; and
a communication system for communicating with the charging station,
wherein the system comprises a controller which is adapted to control the power delivery from the charging station to the electric vehicle based on a comparison of power transfer measurements made by the charging station and by the electric vehicle charging monitor.

The invention establishes trust between the electric vehicle and the charging station. The vehicle and the station can agree on the amount of power transferred to the vehicle. Furthermore, the system can guard against third parties trying to steal power from the link between the vehicle and station during charging. The invention enables electric vehicle charging in all kinds of places, with all kinds of charging stations, without putting a large infrastructure in place, but allowing localized, peer to peer transactions.

The controller can be adapted to interrupt power transfer if a discrepancy is found. In this way, the power transfer can be halted if there is a suspected inconsistency.

The system preferably further comprises a vehicle payment module and a station payment module, wherein the vehicle payment module is adapted to transfer funds to the station payment module.

This enables a secure solution to be provided for payment of charging electric vehicles and providing full control over measurement and payment. The customer can transfer funds to the vehicle payment module, and these are then transferred to the station during charging.

The controller can be adapted to implement the power delivery in increments, and to implement the funds transfer in corresponding increments. In this way, if an inconsistency is found, it can only affect the last power delivery increment.

The vehicle payment module can be part of the vehicle and the station payment module can be in the station; or the vehicle payment module and the station payment module can be in the station, with a payment card interface for the user to the vehicle payment module.

The invention also provides an electric vehicle for using the charging system of any preceding claim, comprising the charging monitor which comprises the power transfer measurement unit and the communication system for communicating with the charging station.

The invention also provides a charging station for implementing the charging system, comprising the power delivery system, the power transfer measurement unit, the communication system for communicating with the electric vehicle and the controller which is adapted to control the power delivery from the charging station to an electric vehicle based on a comparison of power transfer measurements made by the charging station and by an electric vehicle charging monitor.

The method of controlling delivery of electric power to an electric vehicle at a charging system can comprise:
delivering power from a charging station and measuring the power delivered;
receiving power in the electric vehicle and measuring the received power delivered;
implementing communication between the electric vehicle and the charging station;
controlling the power delivery from the charging station to the electric vehicle based on a comparison of the power delivery measurements.

Examples of the invention will now be described in detail with reference to the accompanying drawings, in which.

The invention provides an electric vehicle charging system in which the charging station and the vehicle each have a power transfer measurement unit, and a communication system for communicating data at least from the vehicle to the station. The power delivery is controlled based on a comparison of power transfer measurements made by the charging station and by the electric vehicle.

In this way, both the station and the vehicle contain the functionality to measure the amount of power being transferred. During the charging process, the vehicle and the station can thus continuously measure the amount of power that is being transferred. They exchange the results of these measurements for comparison. When there appears a discrepancy between the two measurements (due to differences in measuring or due to third parties trying to steal power), either the vehicle or station (i.e. the party that has the disadvantage) can abort the power delivery process.

Figure 1:
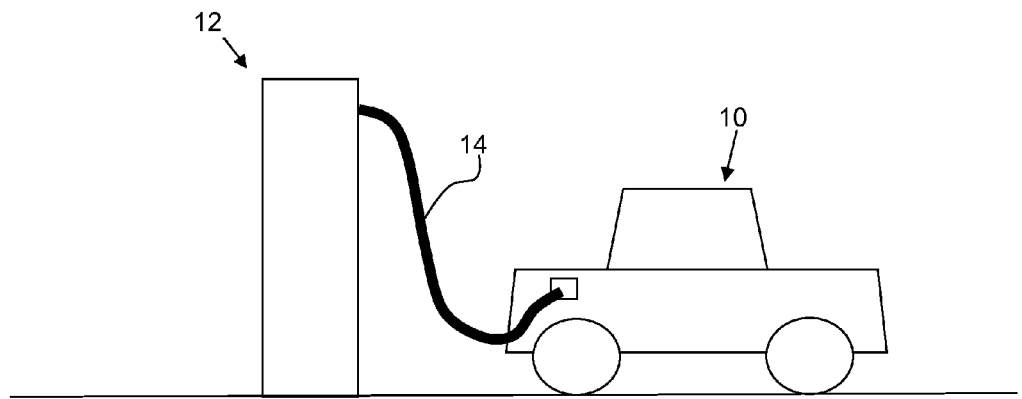
FIG. 1 shows schematically the system of the invention.

FIG. 1 shows schematically the system of the invention, and shows a car 10 (which may of course instead be a bus, lorry, motorbike etc) being charged at a service station recharging unit 12. A power cable 14 couples the car to the service station unit 12, to enable the transfer of power to the car.

The car and the station establish a secure and authenticated channel (SAC) for data communication. This can be over a separate cable so that there is a multiple socket connector at the car, or the data communication can be over the same cable (using power line communication "PLC"). The data communication may even be wireless.

Both the station and the car contain the functionality to measure the amount of power being transferred. During the charging process, the car and the station continuously measure the amount of power that is being transferred. They exchange the results of these measurements for comparison over the data link.

When there appears a discrepancy between the two measurements (due to differences in measuring or due to third parties trying to steal power), either the car or station (i.e. the party that has the disadvantage) can abort the charging process.

Figure 2:
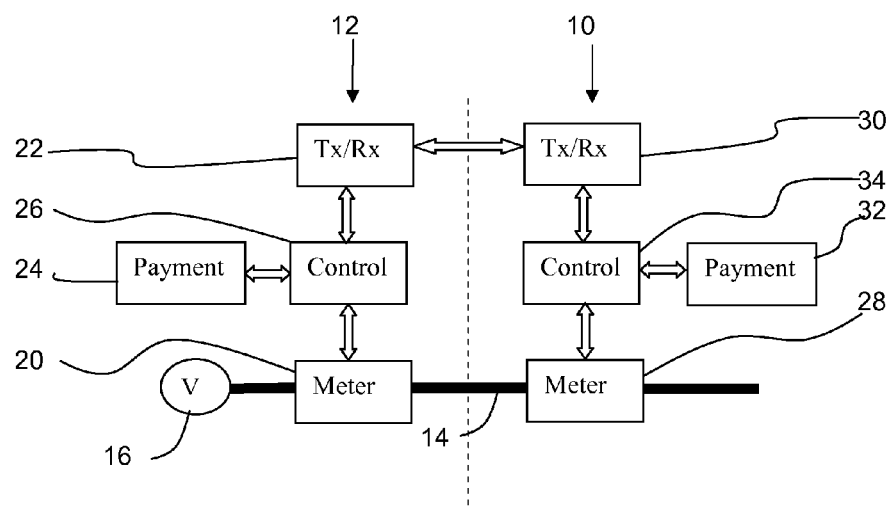
FIG. 2 shows a first example of implementation in more detail.

A first example of a system of the invention is shown in FIG. 2.

The charging station 12 comprises a power delivery system 16 which delivers power through a meter 20 (which is a power transfer measurement unit) to the cable 14. There is a communication system 22 for communicating with the electric car, in the form of a transmitter/receiver unit. The station also has a payment module 24. The various components are under the control of a controller 26.

The car is analogous and has its own meter 28 (power transfer measurement unit) and a communication system 30 for communicating with the charging station. The car also has a payment module 32. The various components are under the control of a controller 34. The vehicle meter 28 and communication system 30 can be considered to form a charging monitor for measuring the charge flow and reporting this using the communication system.

The two controllers 26 and 34 can be considered together to define a system controller which is adapted to control the power delivery from the charging station to the electric car based on a comparison of power transfer measurements made by the charging station and by the electric car charging monitor.

In the simplest implementation, a user can pay for a recharge, and the system delivers the charge, while monitoring that the delivered charge and received charge correspond. The payment can be in advance or afterwards as is the case for conventional refueling at a service station. In this simplest implementation, there is no need for payment modules 24,32, since the payment can be handled independently (as is the case for current petrol or diesel refueling).

A service station payment module can be used to implement automated payment, such as in current 24 hour petrol stations.

If both payment modules are provided, there can be dialogue between the payment modules. For example, authentication for a maximum financial transfer can be obtained, then the power delivery can be made up to that financial maximum, with charging of the appropriate amount (which may be less than the maximum) at the end. The power delivery will however stop if a mismatch is detected.

In a more advanced set of examples, there is interleaved payment and charging, as explained below.

For this purpose, the electric is equipped with the payment module 32 which is capable of sending money to the charging station, and into which the driver can deposit a certain amount of money. The charging station then has the payment module 24 capable of receiving money from the electric car.

When the electric car is wired to the charging station, the electric car payment module 32 connects to the charging station payment module 24 (e.g. via PLC) through the intermediary of the controllers 26,34. The electric car payment module authenticates to the charging station payment module to prove that it can actually pay for the power. This involves a two-way data transfer.

The driver can see the amount of money he will be charged per unit of power. The driver can then indicate the maximum amount of money he wants to spend and/or the maximum amount of power he wants to buy.

When the power starts flowing, both the electric car meter 28 and the charging station meter 20 starts measuring the power that is transferred. When the payment modules agree that one unit of power has been transferred, they complete a payment transaction by which the electric car pays for that unit of power. Then the next unit of power is transferred, paid for, etc.

The unit of power that is paid for per payment transaction should be chosen to be small, in such a way that whenever the payment does not succeed, the amount of money involved is not significant. For example, a typical full recharge may correspond to 50 to 500 units.

When the maximum amount of money or power that the driver indicated is reached, the charging stops. Alternatively, if the payment modules in the electric car and the charging station disagree about the amount of power transferred or money due, the charging is stopped. If the payment transaction does not succeed, the charging is stopped (so the last unit of power may not have been paid for).

In a modification, when a payment transaction is in process, the charging continues. This prevents delays and means that the payment and charging of the next unit of power happen in parallel. There is the risk that if the payment does not succeed (and the charging is stopped), two units of power may not have been paid for, instead of one.

Figure 3:
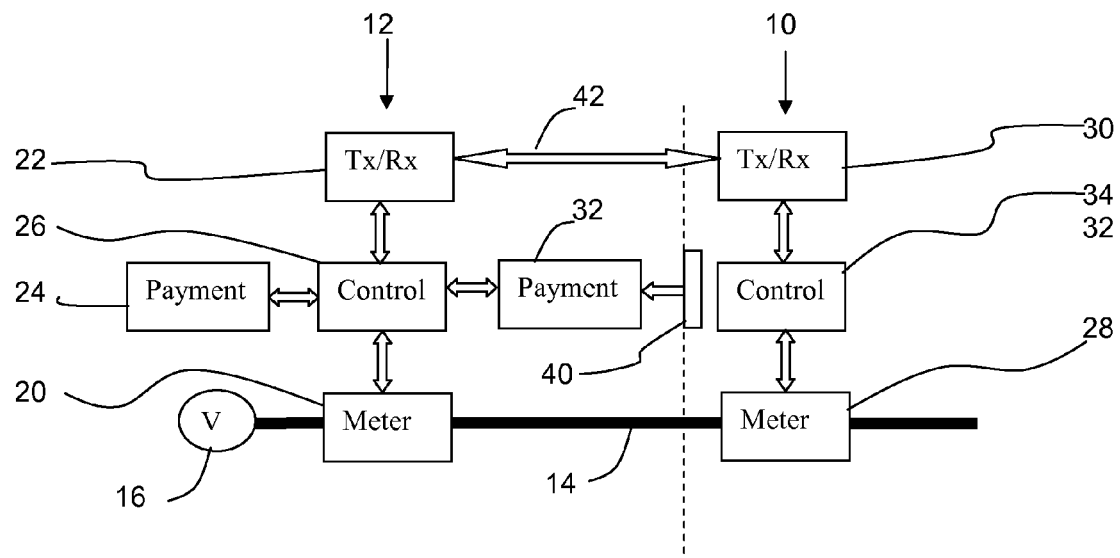
FIG. 3 shows a second example of implementation in more detail.

In a modification shown in FIG. 3 (with the same reference numbers) both payment modules 24,32 are located inside the charging station. Before the charging can start, the payment module for the electric car is loaded/configured by the driver (e.g. by inserting a smart card, loading software). An interface 40 is shown for this purpose. The payment module for the electric car and the electric car meter communicate securely over the data channel 42.

As explained above, the payment transaction can be completed at the end of each unit of power transfer, or else when one payment transaction is in process, the charging continues for the next unit of power.

As a further example, both payment modules can be located inside the electric car. Before the charging can start, the payment for the charging station is loaded/configured by the charging station (e.g. by transferring the necessary data to the electric car). The payment module for the charging station and the charging station meter again communicate securely over the data channel.

Figure 4:
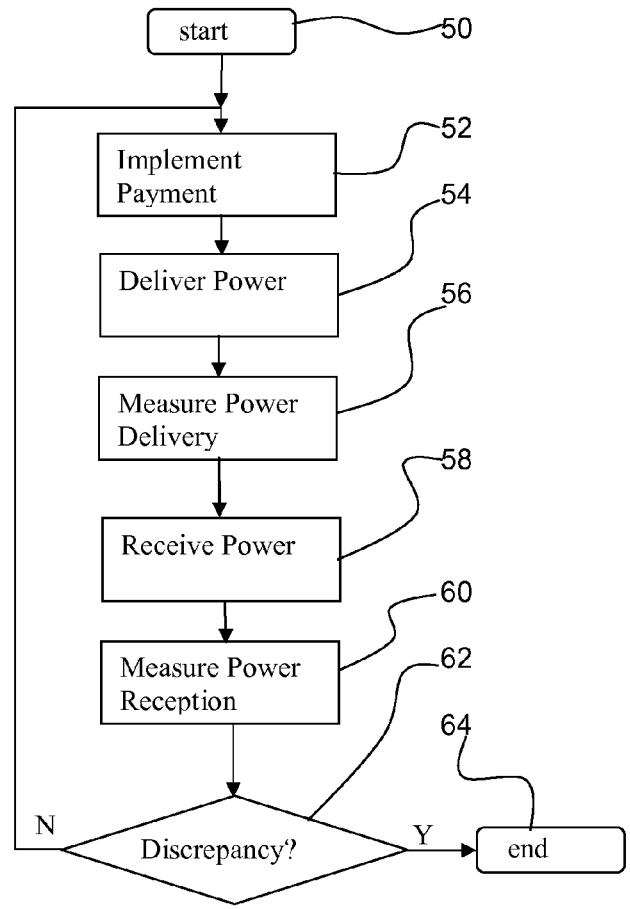
FIG. 4 shows an example of method of the invention.

FIG. 4 shows the method of the invention.

The method starts in step 50. The payment is implemented in step 52. In the example shown in FIG. 4, this payment is for one unit of power only, so that the method (including the payment step) is repeated multiple times. As explained above, in more simple examples, the payment step can be a single step carried out only once at the beginning or end of the power delivery process.

In step 54, power is delivered from the charging station and in step 56 the power delivered is measured.

In step 58, power is received in the electric vehicle and in step 60 the received power is measured.

In step 62 is the comparison of the power delivery measurements (using communication between the electric vehicle and the charging station). If a discrepancy is found, the power delivery from the charging station to the electric vehicle is halted, and the method ends (step 64). If there is agreement, the method repeats for the next unit of power. If the method has been ended as a result of a discrepancy, then an alarm will be triggered to cause the service station operator to investigate further.

The advantages of the invention include:

1. Low cost

No large back-end infrastructure is needed. The initial set-up cost can be low, because the station can operate autonomously (no on-line back-end needed). The payment modules can be implemented using hardware shared for example with an on board unit of a road tolling system. Third parties stealing power are implicitly detected by the measurement comparison process; no extra hardware or software is needed.

2. Flexibility

All kinds of payment methods are suitable. No prior relationship between the car and the owner of station needs to exist.

3. Security

Both car and station measure the amount of power transferred. Whenever they disagree, the transfer is stopped. If the transaction amount is small enough, the most that can be stolen from the system is a single transaction amount. In this case, there is little or no incentive for third parties to steal power from this connection, so no additional physical security is required against tapping power from the wire.

In the preferred example, both the vehicle and the station can stop the power delivery, and there is a two way communication between the two. However, the communication of the meter reading can be only from the vehicle to the station, and the station then has all the necessary information to judge whether there is a mismatch. There will however be two way communication authentication or handshaking protocols associated with the payment mechanisms, The concepts underling the invention could be applied in any application where a device is charging from someone else's power and it has to be paid for. Thus, the concepts could be applied to the charging of mobile devices, such as mobile phones and laptops.

The invention can be applied to all electric vehicles such as electric bikes, Segways, golf carts, electric wheelchairs, electric boats and their corresponding charging stations. For some business models, it could be applied for home electricity metering.

The various units required to implement the system of the invention have not been described in detail. The measurement of power transfer is totally routine; indeed all customer electricity units measure power delivery based on the current drawn and the voltage levels. The security measures to accompany the financial transactions are also conventional.

Various other modifications will be apparent to those skilled in the art.

The invention claimed is:

1. An electric vehicle charging system, comprising:
    a charging station which comprises:
        a power delivery system;
        a power transfer measurement unit; and
        a communication system configured to communicate with an electric vehicle; and
    a charging monitor mounted in the electric vehicle which comprises:
        a power transfer measurement unit; and
        a communication system configured to communicate with the charging station;
    a controller, which is configured to control the power delivery from the charging station to the electric vehicle based on a comparison of a first power transfer measurement made by the charging station and a second power transfer measurement made by the charging monitor mounted in the electric vehicle;
    a vehicle payment module; and
    a station payment module, wherein the vehicle payment module is configured to transfer funds to the station payment module, and the controller is configured to implement the power delivery in increments, and to implement the funds transfer in corresponding increments.

2. The system as claimed in claim 1, wherein the controller is configured to interrupt power transfer if a discrepancy is found between the first power transfer measurement and the second power transfer measurement.

3. The system as claimed in claim 1, wherein the vehicle payment module is in the vehicle and the station payment module is in the station.

4. An electric vehicle configured to use the electric vehicle charging system of claim 1, comprising the charging monitor control system which comprises the power transfer measurement unit and the communication system configured to communicate with the charging station.

5. A charging station for implementing the charging system of claim 1, comprising the power delivery system, the power transfer measurement unit, the communication system configured to communicate with the electric vehicle and the controller which is configured to control the power delivery from the charging station to the electric vehicle based on a comparison of the first power transfer measurement and the second power transfer measurement.

6. A method of controlling delivery of electric power to an electric vehicle at a charging system, comprising:
    delivering power from the charging station to the electric vehicle and measuring a first power transfer measurement;
    receiving power in the electric vehicle from the charging station and measuring a second power transfer measurement;
    implementing communication between the electric vehicle and the charging station;
    controlling the power delivery from the charging station to the electric vehicle based on a comparison of the first power transfer measurement and the second power transfer measurement;
    transferring funds from a vehicle payment module to a station payment module; and
    implementing the power delivery in increments, and implementing the funds transfer in corresponding increments.

7. The method as claimed in claim 6, comprising:
    interrupting power transfer if a discrepancy is found between the first power transfer measurement and the second power transfer measurement.

8. A non-transitory computer readable medium containing instructions for controlling delivery of electric power to an electric vehicle at a charging station, comprising:

instructions for delivering power from the charging station to the electric vehicle and measuring a first power transfer measurement;

instructions for receiving power in the electric vehicle from the charging station and measuring a second power transfer measurement;

instructions for implementing communication between the electric vehicle and the charging station;

instructions for controlling the power delivery from the charging station to the electric vehicle based on a comparison of the first power transfer measurement and the second power transfer measurement;

instructions for transferring funds from a vehicle payment module to a station payment module; and instructions for implementing the power delivery in increments, and implementing the funds transfer in corresponding increments.

* * * * *